United States Patent [19]

Putnam

[11] 4,013,363

[45] Mar. 22, 1977

[54] VESICULAR FILM ADVANCING MODULE

[75] Inventor: Dean H. Putnam, Toledo, Ohio

[73] Assignee: Magnagard Equipment Manufacturing Corporation, Toledo, Ohio

[22] Filed: July 21, 1975

[21] Appl. No.: 597,443

[52] U.S. Cl. .................................. 355/97; 355/123

[51] Int. Cl.[2] .......................................... G03B 27/04

[58] Field of Search ............ 355/97, 122, 123, 100, 355/106, 27, 28

[56] References Cited

UNITED STATES PATENTS

| | | | |
|---|---|---|---|
| 3,751,165 | 8/1973 | Inoue et al. | 355/97 |
| 3,817,618 | 6/1974 | Riley et al. | 355/97 |
| 3,836,252 | 9/1974 | Touchette et al. | 355/97 |

*Primary Examiner*—L. T. Hix
*Assistant Examiner*—J. A. LaBarre
*Attorney, Agent, or Firm*—William J. Clemens

[57] ABSTRACT

A film advancing module which co-operates with a basic processing module to duplicate a master microfiche. The film advancing module includes a film drawing station for drawing a continuous strip of vesicular microfilm from the basic processing module into the film advancing module, a film cutting station for separating an exposed film segment from the continuous strip of microfilm, a film heating station for heating the film segment, a film cooling station for cooling the film segment, a film clearing station for clearing the film segment and a film receiving station for collecting the film segment. The film heating and cooling stations are positioned to define a generally S-shaped path of travel which tends to remove any curl in the film and all the stations are positioned to define a relatively compact path of travel for the film segment. The film cooling and clearing stations are connected in series to a source of cooling air to conduct heat away from the film segment.

9 Claims, 8 Drawing Figures

VESICULAR FILM ADVANCING MODULE

CROSS-REFERENCE TO RELATED APPLICATION

The vesicular film advancing module of the present invention may be utilized with the basic processing module disclosed in co-pending patent application Ser. No. 587,082, filed June 16, 1975 and entitled "MODULAR MICROFICHE DUPLICATOR" which is assigned to the assignee of the present invention.

BACKGROUND OF THE INVENTION

1. FIELD OF THE INVENTION

This invention relates in general to a microfiche processing apparatus and in particular to a vesicular film advancing module which co-operates with a basic processing module for processing vesicular microfilm to make duplicates of master microfiche.

2. DESCRIPTION OF THE PRIOR ART

One form of microfilm is microfiche which is generally known as a group of related images arranged on a card-like transparent sheet of film. Typically, these sheets measure 105 mm by 148 mm and are unmounted. The wide-spread use of microfiche has led to a demand for a means of duplicating the microfiche. However, the use of three major types of duplicating film, silver film, diazo film and vesicular film, requires the utilization of three different developing processes with their associated developing apparatus.

The vesicular microfilm generally has a transparent polyester base coated with a layer of thermoplastic resin which includes an ultraviolet sensitive diazonium salt uniformly dispersed within the resin. The film is exposed to a light source through a master microfiche whereupon the salt decomposes in those areas corresponding to the transparent areas of the master microfiche. The decomposing salt releases nitrogen gas so that when the film is heated, the resin will soften to allow the gas to expand to form microscopic vesicules. Since these vesicules are of a different index of refraction than the surrounding resin, they will tend to scatter incident light to form the image. The film is then cooled to prevent excessive growth of the vesicules. Next the film is exposed to ultraviolet light of a high intensity to decompose the previously unexposed salt. The nitrogen gas forms slowly and diffuses to leave clear areas on the film thereby forming a negative of the master microfiche.

Previous vesicular film processors comprised separate machines for exposure and development or a single machine combining both functions. Where separate machines were utilized only one exposure machine and three developers were required to handle the three types of film, but the manual labor involved in transferring the exposed film to the proper developer was costly. Where both functions were combined in the same machine, a substantial investment was required since three different machines were needed to process the three types of film and two exposure machines were included.

An attempt to reduce the previously mentioned costs produced the microfiche duplicator disclosed in U.S. Pat. No. 3,836,252, issued Sept. 17, 1974. This duplicator combined in a single machine one exposure station and separate diazo and vesicular film developing means. However, this machine was limited in flexibility since only two of the three basic types of film could be developed and it was difficult to add means for developing any other type of film. Furthermore, this machine was more expensive than a duplicator for only one type of film where the capability for duplicating the other type of film was not required.

As shown in U.S. Pat. No. 3,775,711, the duplicator defines a generally U shaped path of travel to return the copy sheet adjacent the master microfiche. Since the same light source is utilized for exposing and clearing the film, a mechanical operated reflector must be actuated to illuminate the copy when it is in the clearing area. Cooling air is supplied to the exposure and clearing assembly by a first blower and a pair of hoses connected in parallel and is exhausted by a second blower. Thus, in an attempt to provide a compact duplicator for two different types of microfilm, the complexity of the machine has been increased.

SUMMARY OF THE INVENTION

The present invention relates to a vesicular microfilm advancing module which co-operates with a basic processing module to make duplicates of master microfiche. A segment of a continuous strip of microfilm is exposed in superposition with the master microfiche in the basic processing module and is advanced into the film advancing module by a film drawing station. The film advancing module includes the film drawing station and a plurality of other film stations for performing selected operations on the film segment.

The exposed film segment is separated from the continuous strip of microfilm by a film cutting station and is heated in a film heating station to form vesicules in the exposed areas. Then the film segment is cooled in a film cooling station to prevent excessive growth of the vesicules. Next the film segment is subjected to a high intensity ultraviolet light in a film clearing station to decompose the previously unexposed salt and leave clear areas on the film segment. Now the film segment is collected in a film receiving station.

In the present invention, the above described film stations are positioned to form a relatively compact path of travel for the film segment. The film heating and cooling stations are positioned to define a S shaped path of travel which tends to remove any curl in the film. The film cooling and clearing stations are connected in series to a source of cooling air to conduct heat away from the film segment.

It is an object of the present invention to provide a vesicular film advancing module which can be utilized to separate, develop and collect a film segment exposed in a basic processing module.

It is another object of the present invention to provide a film advancing module having at least two film stations positioned to form a relatively compact path of travel for a film segment being developed.

It is a further object of the present invention to provide a film advancing module having a film cooling station and a film clearing station connected in series for receiving a flow of cooling air.

It is another object of the present invention to provide a modular microfiche duplicator for processing and developing different types of microfilm at a minimum investment in duplicating equipment and with a reduction in the manual labor involved.

DESCRIPTION OF THE PREFERRED EMBODIMENT

Figure 1:
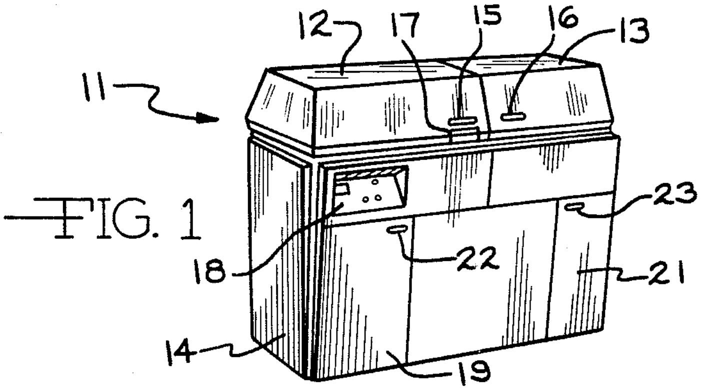
FIG. 1 is a perspective view of a modular microfiche duplicator including a vesicular film advancing module according to the present invention.

Referring to FIG. 1, there is shown in a perspective view a modular microfilm duplicator including a vesicular film advancing module according to the present invention, housed in a cabinet generally designated by a reference numeral 11. The cabinet 11 includes a basic processing module cover 12 and a film advancing module cover 13 mounted atop a base 14. Both the covers 12 and 13 are hingedly attached to the base 14 along the rear edge thereof. Recessed handles 15 and 16 are formed on the front surfaces of the covers 12 and 13 respectively so that the covers may be raised to reveal the basic processing module and the film advancing module. An aperture 17 is formed in the front surface of the cover 12 for inserting and retreiving the master microfiche from the basic processing module.

The base 14 includes a base frame (not shown) covered by the external panels which cooperate with the covers 12 and 13 to shield the mechanisms of the duplicator from view and to provide a pleasing appearance. A recessed control panel 18 from which the functions of the duplicator can be controlled, is located in the front surface of the base 14 adjacent the cover 12. A pair of doors 19 and 21 are hingedly attached to the base 14, one at either end thereof, and can be opened by utilizing a pair of recessed handles 22 and 23 formed in the front surfaces of the doors 19 and 21 respectively, to reveal storage areas in the base 14.

The basic processing module located under the cover 12 may be the module disclosed in the co-pending United States patent application Ser. No. 587,082, filed June 16, 1975, entitled "MODULAR MICROFICHE DUPLICATOR" and assigned to the assignee of the present invention. The basic processing module exposes a continuous strip of microfilm in super-position with a master microfiche to a source of light to form a latent image of the master microfiche. The exposed film is then drawn into a film advancing module located under the cover 13. The film advancing module may be a silver film module which is disclosed in the application Ser. No. 587,082 and is incorporated by reference herein. The silver film module is utilized to collect the exposed strip of film for further processing outside the modular microfilm duplicator. A vesicular film advancing module, which is the subject of this application, may be utilized to develop and collect exposed vesicular film microfiche duplicates. A diazo film advancing module may be utilized to develop and collect exposed diazo film microfiche duplictes.

Figure 2:
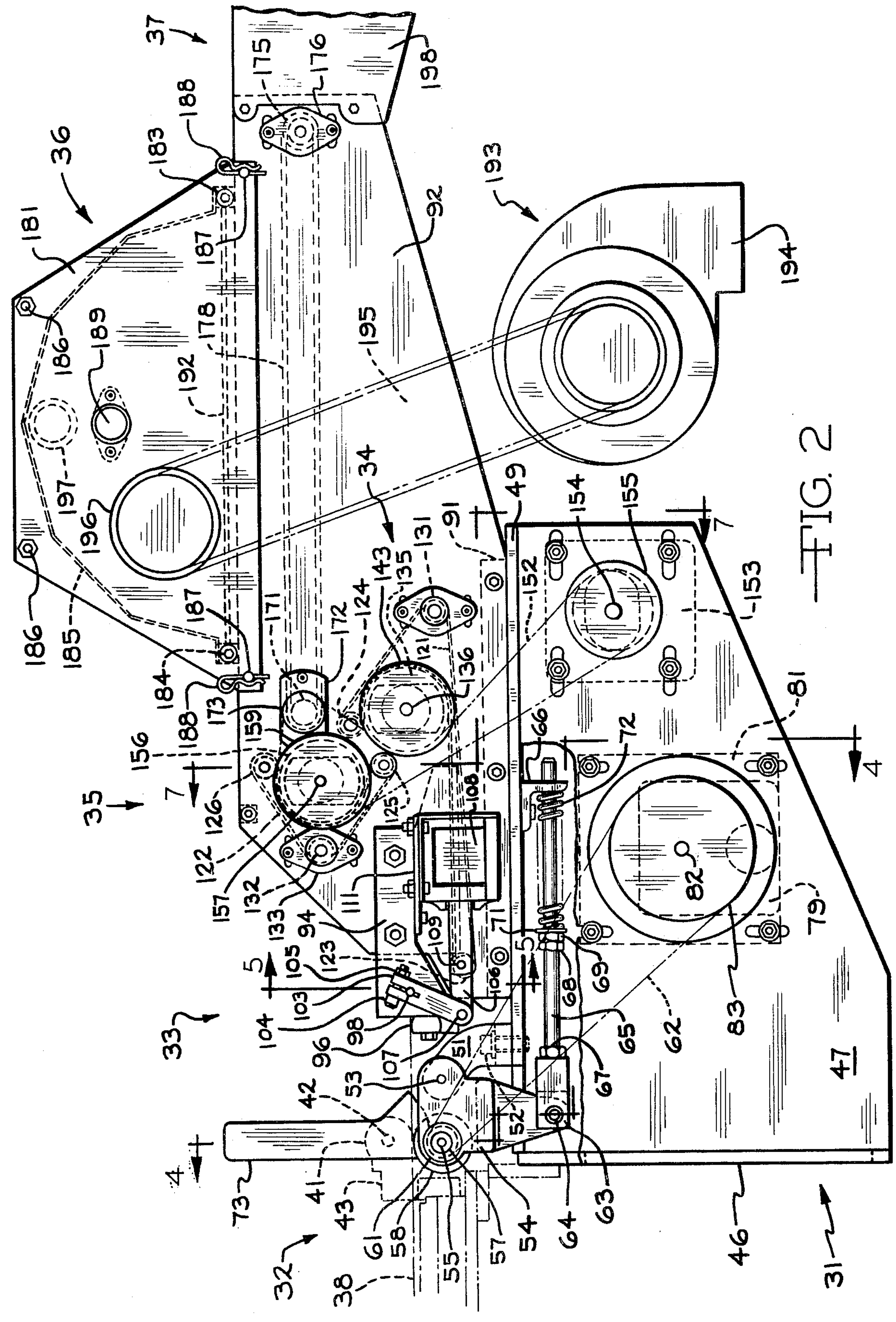
FIG. 2 is a fragmentary front elevational view of the film advancing module of FIG. 1.
Figure 3:
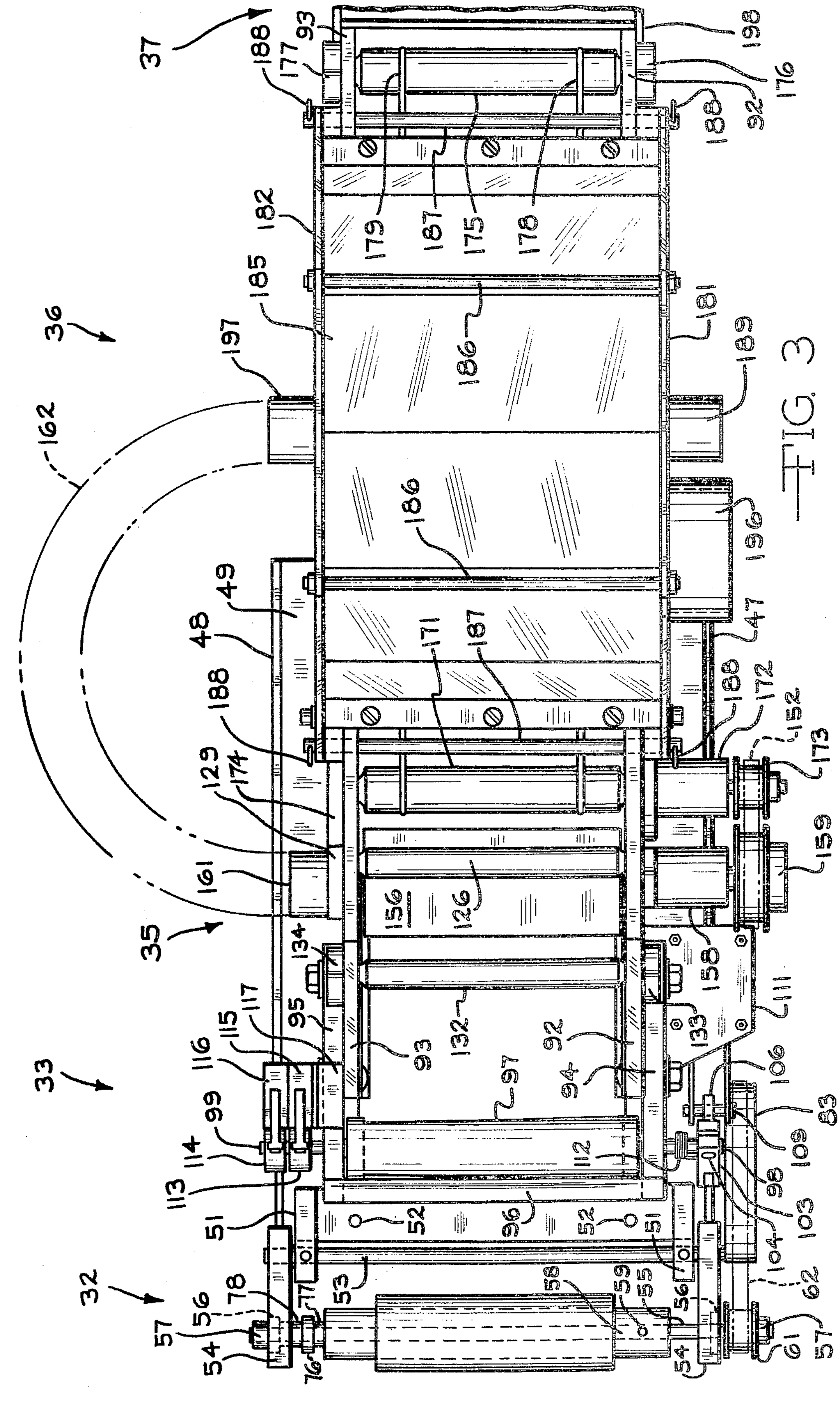
FIG. 3 is a plan view of the film advancing module of FIG. 2.

FIG. 2 is a front elevational view and FIG. 3 is a plan view of the vesicular film advancing module according to the present invention. The vesicular film module draws the exposed film in a continuous strip from the basic processing module of the modular microfilm duplicator, separates the film into segments each containing a duplicated master microfiche latent image, develops the segments as individual microfiche and collects the microfiche. The module includes a plurality of film stations for performing selected operations on the microfilm. These stations are positioned to form a generally S shaped, compact path of travel through the module.

A module mounting bracket 31 may be attached to a frame (not shown) of the base 14 to support the developing apparatus. Mounted on the upper surface of the bracket 31 is a film drawing station 32, a film cutting station 33, a film heating station 34, a film cooling station 35, a film clearing station 36 and a film receiving station 37. A continuous strip of vesicular film 38, shown in phantom, is exposed in the basic processing module to form latent images from the master microfiche and is pulled into the film advancing module by the film drawing station 32. The continuous strip of film is cut into segments of standard microfiche size, 105mm by 148mm, in the cutting station 33. These segments are duplicates of the master microfiche and are now ready for the developing process.

Vesicular film generally has a transparent polyester base coated with a layer of thermoplastic resin which includes an ultraviolet sensitive diazonium salt uniformly dispersed within the resin. In the basic processing module, the film was exposed to a light source through a master microfiche whereupon the salt decomposed in those areas corresponding to the transparent areas of the master microfiche. The decomposing salt releases nitrogen gas. When the film is heated in the heating station 34, the resin will soften to allow the gas to expand to form microscopic vesicules. Since these vesicules are of a different index of refraction than the surrounding resin, they will tend to scatter incident light to form the image. The film is then cooled in the cooling station 35 to prevent excessive growth of the vesicules. Next, the film is exposed to ultraviolet light of a high intensity in the film clearing station 36 to decompose the previously unexposed salt. The nitrogen gas forms slowly and diffuses to leave clear areas on the film. The film exits the film clearing station 36 and is collected in the film receiving station 37 as a negative of the master microfiche.

Figure 4:
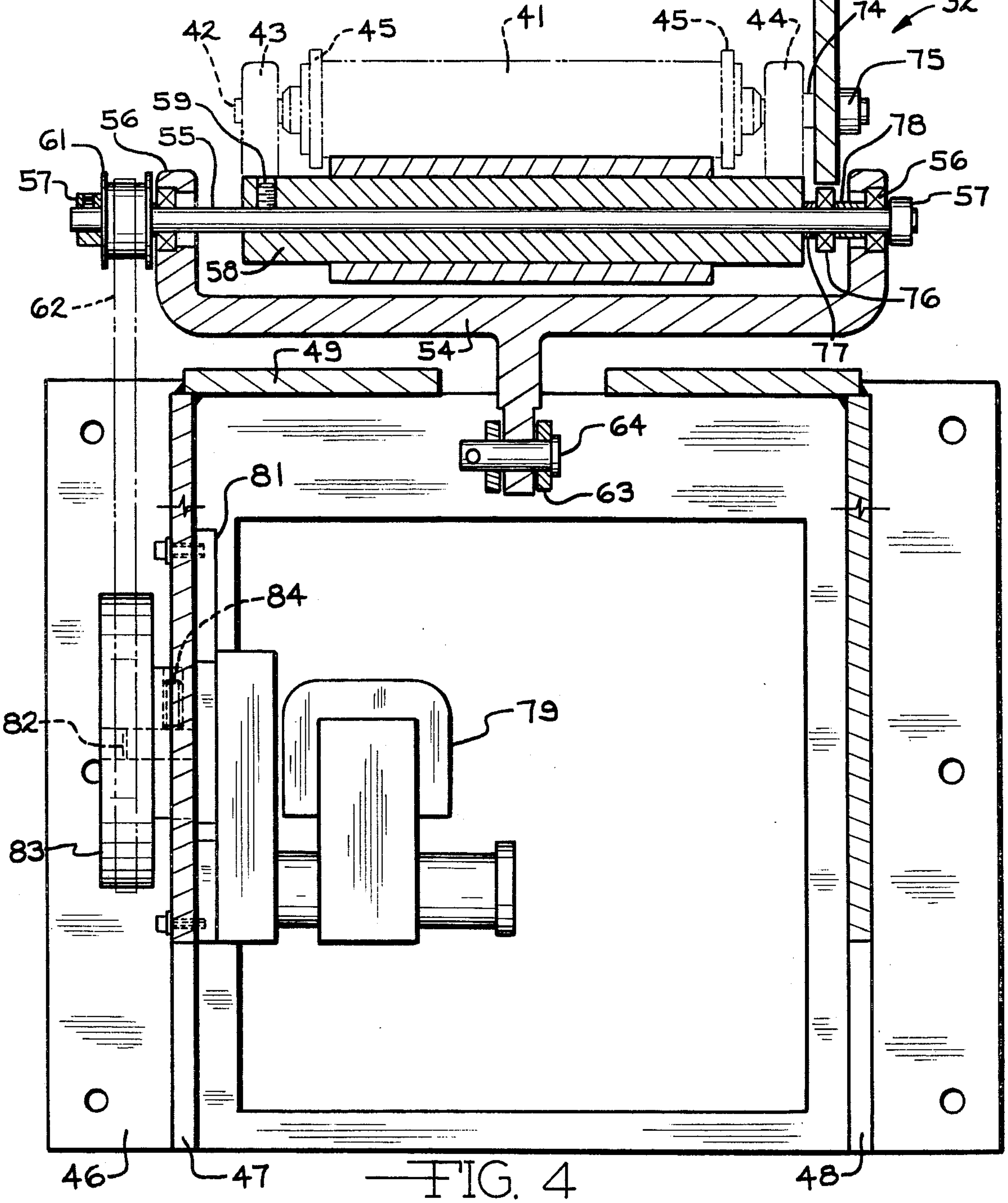
FIG. 4 is a cross-sectional view of the film drawing station of FIGS. 2 and 3 taken along the line 4—4 of FIG. 2.

FIG. 4 is a cross-sectional view of the film drawing station 32 of the vesicular film advancing module taken along the line 4—4 of FIG. 2. Referring to FIGS. 2, 3 and 4, there is shown the vesicular film advancing module attached to the right side of the frame of the basic processing module. A portion of the frame and a guide roller 41 of the basic processing module are shown in phantom. The guide roller 41 is rotatably mounted on a shaft 42 which is attached to a pair of mounting brackets 43 and 44. The guide roller 41 has formed at either end thereof a guide 45 for defining the edges of a path of travel for the continuous strip of film 38 as it exits the basic processing module and enters the film drawing station 32.

The module mounting bracket 31 is formed with a vertically positioned end plate 46 which is fastened to the right side of the basic processing module frame by any suitable means such as cap screws, lockwashers and nuts such that the vesicular film advancing module can easily be replaced by a module for advancing a different type of film. A pair of support plates, front support plate 47 and rear support plate 48, extend perpendicularly from the outwardly facing planar surface of the end plate 46. A mounting plate 49 rests on the top edges of the support plates and the end plate 46, the support plates 47 and 48 and the mounting plate 49 are attached together as by welding to form the module mounting bracket 31.

The film drawing station 32 includes a pivot bracket 51 mounted on the upper surface of the mounting plate 49 with cap screws 52. The pivot bracket 51 is formed with a pair of upstanding bosses which extend toward the guide roller 41. A pivot shaft 53 extends through an aperture formed in each of the bosses and is secured against rotation by a pair of set screws which are axially threaded into the bosses for frictional engagement with the pivot shaft 53. The ends of the pivot shaft 53 extend beyond the outwardly facing surfaces of the pivot bracket bosses and are inserted into apertures in a pair of upper legs of a Y shaped yoke 54. The yoke 54 is free to rotate about the axis of the pivot shaft 53 yet is prevented from movement along that axis by the bosses.

Also formed in the upper legs of the yoke 54 are a pair of apertures for receiving the ends of a roller shaft 55. The shaft 55 is free to rotate in a pair of ball bearings 56 press fitted into the legs of the yoke. A pair of set collars 57, one attached at either end of the shaft 55, militate against axial movement of the shaft in the bearings. The shaft extends through an axial aperture in a drawing roller 58 which is attached to the shaft with a radially threaded set screw 59 which frictionally engages the shaft. The roller 58 has a neoprene driving surface formed thereon. If the yoke 54 is rotated in a clockwise direction, as viewed in FIG. 2, about the pivot shaft 53, the neoprene driving surface of the roller 58 will trap the strip of film 38 against the guide roller 41. A pulley 61 is attached to the forwardly facing end of the shaft 55 between the bearing 56 and the set collar 57. If the pulley is rotated in a clockwise direction by a motor driven belt 62 shown in phantom, the neoprene driving surface of the roller 58 will frictionally engage the lower surface of the film strip 38 to draw it through the basic processing module and into the vesicular film advancing module.

The drawing roller 58 is maintained in engagement with the film strip through a force applied to the lower leg of the Y shaped yoke 54. This lower leg extends through an aperture in the mounting plate 49 and is connected to one end of a clevis coupling 63 by a clevis pin 64. The other end of the clevis coupling threadably engages one end of a spring pin 65. The other end of the spring pin is inserted through an aperture in a spring pin guide 66 which is attached to the lower surface of the mounting plate 49. A stop nut 67 is threaded onto the spring pin 65 and against the clevis coupling 63 to prevent the spring pin from disengaging from the coupling. A pair of stop nuts 68 and 69 are threaded onto the spring pin 65 at a point approximately midway between the coupling 63 and the spring pin guide 66. A flat washer 71 is positioned on the spring pin adjacent the stop nut 69 and a helical spring 72 is compressed between the flat washer 71 and the guide 66. Since the spring pin 65 is free to move in the aperture of the guide 66, the clevis coupling will be forced in a direction away from the guide to apply a force to the yoke 54 which creates a clockwise movement about the pivot shaft 53. Thus, the neoprene driving surface of the drawing roller 58 is maintained in contact with the lower surface of the strip of film 38.

When it is desired to remove the strip of film from the film drawing station, the drawing roller 58 may be rotated in a counterclockwise direction utilizing a lever arm 73. The rearwardly facing end of the shaft 42 is inserted through an aperture in a spacer 74 and aperture in the lever arm 73. The lever arm 73 and the spacer 74 are trapped between the rearwardly facing surface of the mounting bracket 44 and a set collar 75. However, the lever arm is free to rotate about the shaft 42. The lower end of lever arm 73 has formed thereon a camming surface including a first depression shown in FIGS. 2 and 4 as engaging the edge surface of a ball bearing 76. The rearwardly facing end of the roller shaft 55 is inserted through an aperture in a first spacer 77, an aperture in the ball bearing 76 and an aperture in a second spacer 78 respectively. The two spacers and the ball bearing are trapped between a rearwardly facing end surface of the drawing roller 58 and a forwardly facing surface of the ball bearing 56. The shortest dimension between the pivot point of the lever arm 73 and the edge of the first depression of the cam surface is such as to allow the neoprene surface of the drawing roller 58 to come into contact with the lower surface of the film strip 38 and be slightly compressed. The lever arm 73 may be rotated in a clockwise direction about the shaft 42 to bring a second depression on the camming surface into contact with the ball bearing 76. The shortest dimension between the pivot point of the lever arm and the edge of the second depression is such that the neoprene surface of the drawing roller is forced out of contact with the lower surface of the strip of film and the film is released from the drawing station so that it may be removed from the vesicular film advancing module.

A magnetic brake gear motor 79 is attached to the rearwardly facing surface of a motor mounting plate 81. The motor mounting plate 81 is attached to the rearwardly facing surface of the front support plate 47 by any suitable means such as cap screws and lockwashers. The cap screws are inserted into vertically elongated apertures formed in the support plate 47 and threadably engage the mounting plate 81. An output shaft 82 of the gear motor 79 extends through apertures in the mounting plate 81 and the support plate 47. A pulley 83 is attached to the end of the output shaft by a set screw 84. The cap screws may be loosened to allow vertical movement of the mounting plate 81 to adjust the tension on the belt 62 which engages the pulley 83. When the gear motor 79 is energized from a power source (not shown) the drawing roller 58 will be rotated to draw the strip of film into the developing module. The magnetic brake may be actuated to stop the gear motor and hold it and the drawing roller 58 against rotation as the strip of film is being cut.

Figure 5:
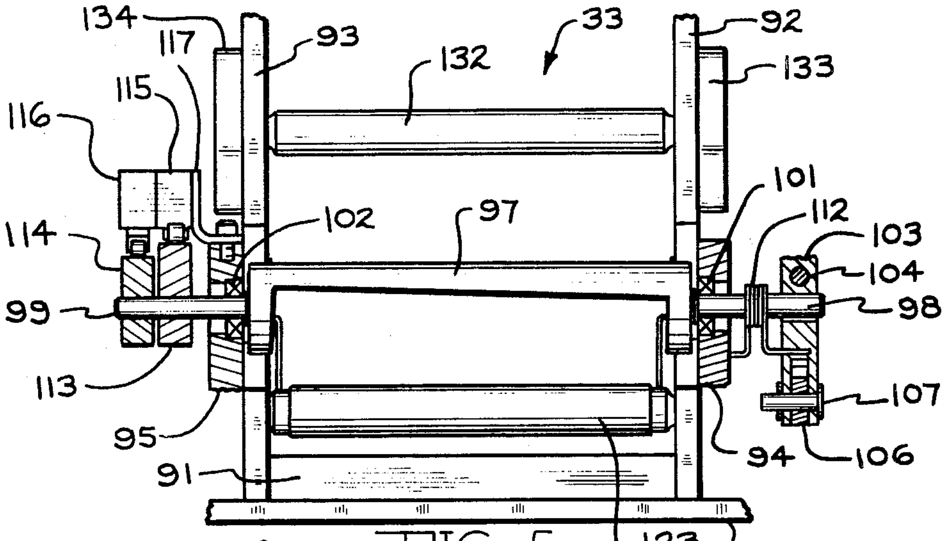
FIG. 5 is cross-sectional view of the film cutting station of FIG. 2 and 3 taken along the line 5 —5 of FIG. 2.
Figure 6:
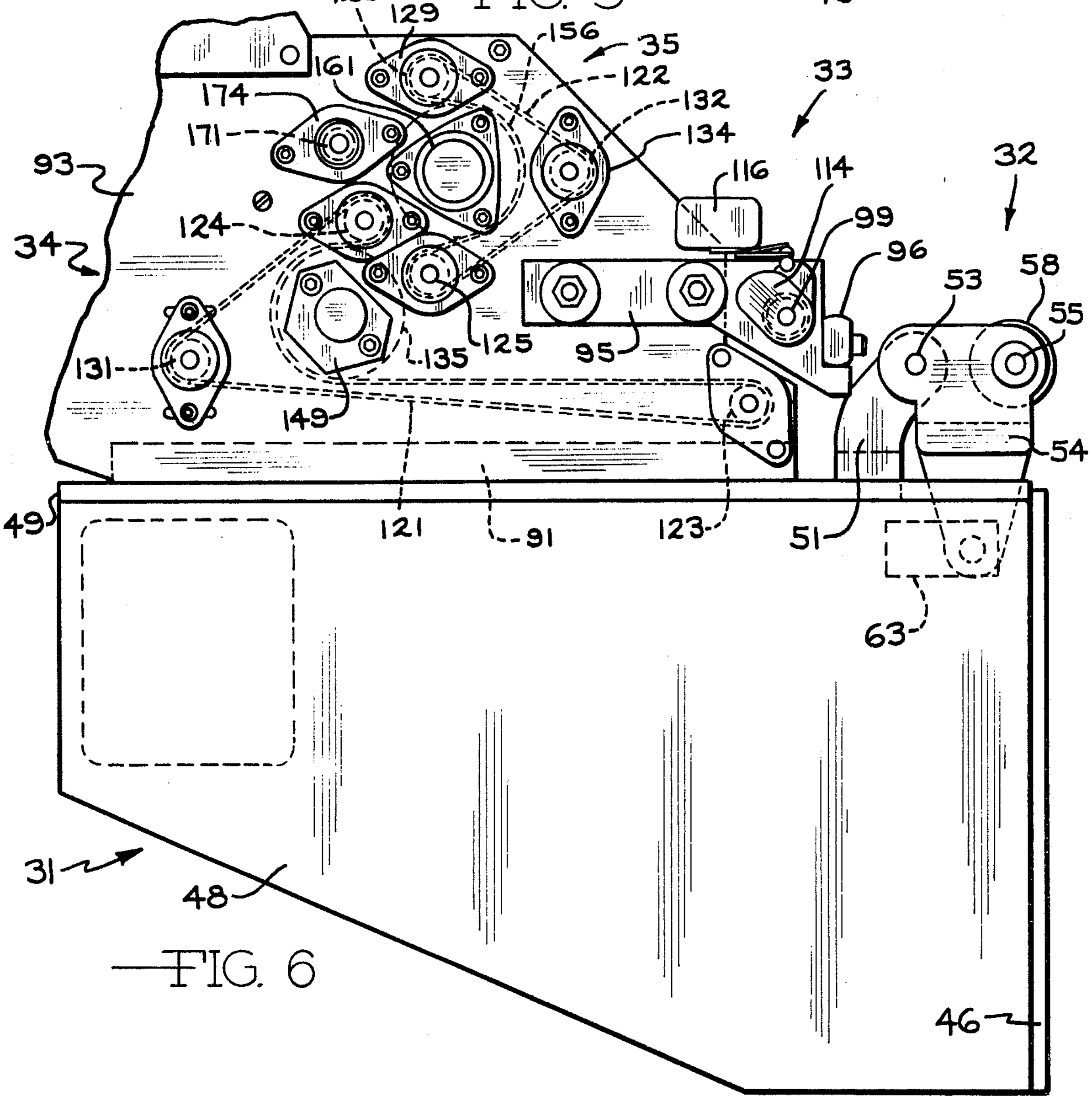
FIG. 6 is a fragmentary rear elevational view of the film cutting station, the film heating station and the film cooling station of FIGS. 2 and 3.

The strip of film 38 passes through the film drawing station 32 and enters the film cutting station 33 where it is cut into segments equal in length to a standard microfiche, each segment containing the latent image of a master microfiche. FIG. 5 is a cross-sectional view if the film cutting station 33. FIG. 6 is a fragmentary rear elevational view of the cutting station. Referring to FIGS. 2, 3, 5 and 6, there is shown a spacer plate 91 attached to the upper surface of the mounting plate 49 by any suitable means such as cap screws. Attached to the front and rear edge surfaces of the spacer plate 91 are a front mounting plate 92 and a rear mounting plate 93 respectively on which the film cutting station 33, the film heating station 34, the film cooling station 35, the film clearing station 36 and the film receiving 37 are mounted.

The film cutting station 33 includes a front knife mounting bracket 94 which is attached to the forwardly facing surface of the front mounting plate 92 and a rear knife mounting bracket 95 which is attached to the rearwardly facing surface of the rear mounting plate 93. A knife bar 96 is attached to the ends of the mounting brackets 94 and 95 adjacent the film drawing station 32. The upper edge of the knife bar 96 which faces the mounting brackets is a knife edge which co-operates with a rotating knife to cut the continuous strip of microfilm across its width. The opposite upper edge of the knife bar may also be a knife edge so that the bar can be reversed to double its cutting life. The upper surface of the knife bar may be coated with TEFLON to prevent scratching the lower surface of the film.

A knife roller 97 has formed at either end thereof a shaft extension, front shaft 98 and rear shaft 99, which extend through apertures in the mounting brackets 94 and 95 respectively. The front shaft 98 rotates in a ball bearing 101 press fitted into the mounting bracket 94 and the rear shaft 99 rotates in a ball bearing 102 press fitted into the monting bracket 95. A knife edge is formed at the intersection of a planar surface with the exterior cylindrical surface of the roller 97. As shown in FIG. 5, more than one half of the roller is cut away to define the planar surface which has a chordal edge adjacent the front shaft extension 98 and extends away from the axis of the roller at approximately 1° 30 minutes to an opposite chordal end adjacent the rear shaft extension 99. Thus, as the roller 97 is rotated in a counterclockwise direction, as viewed in FIG. 2, the strip of film will be caught between the knife edge of the roller 97 and the knife edge of the bar 96. Since the knife edge of the roller is tapered with respect to the axis of the roller, only a point contact will be made with the film so that the point contact travels from the front end to the rear end of the roller as it rotates to cut across the width of the strip of film.

The front shaft extension 98 is inserted through an aperture in a knife actuator arm 103. A slot extends from the upper end of the arm to the aperture to form a pair of legs. A cap screw 104 extends through an aperture in each of the legs and threadably receives a nut 105 which may be tightened to force the legs toward one another thereby clamping the arm 103 in a selected position on the shaft 98. The lower end of the arm has a clevis formed thereon which is connected to one end of a link 106 by a clevis pin 107. The other end of the link 106 is connected to an actuating rod of a solenoid 108 by a clevis pin 109.

The solenoid 108 is attached to a solenoid mounting plate 111 which in turn is attached to the lower edge surface of the front knife mounting bracket 94. The solenoid may be actuated to retract its actuating rod which forces the arm 103 and the knife roller 97 to rotate in a counterclockwise direction about the axis of the knife roller thereby cutting across the width of the continuous strip of film. When the actuating arm is fully retracted, the solenoid coil may be turned off and a torsion spring 112 will rotate the arm 103 back to its original position to move the knife edge of the roller 97 away from the knife edge of the bar 96. The spring 112 has one end inserted in an aperture formed in the front knife bracket and the other end inserted in the arm 103. The spring is helically wound in a direction to tend to force the arm 103 to rotate in a clockwise direction limited by the free travel of the actuating rod of the solenoid 108.

The rear shaft extension 99 extends through an aperture in a pair of cams 113 and 114. Each cam is attached to the shaft extension 99 by a set screw. The cam 113 and 114 rotate with the shaft to actuate a pair of microswitches 115 and 116 respectively. The microswitches 115 and 116 are attached to a switch mounting bracket 117 which in turn is attached to the rear knife mounting bracket 95. The cams 113 and 114 are angularly displaced from one another such that the cam 113 actuates the microswitch 115 when the knife roller is at rest and the cam 114 actuates the microswitch 116 when the knife roller is rotated to the position defined by the end of travel of the actuating rod of the solenoid 108. If the solenoid is energized from a power source (not shown) to rotate the knife roller, the cam 113 may be positioned to actuate the microswitch 115 when the strip of microfilm has been completely cut. The actuation of the microswitch 115 will disconnect the solenoid from the power source and the tension spring will return the solenoid and the knife roller to the rest position. At this point the cam 114 actuates the microswitch 116 which actuates the film drawing station 32 to advance the strip of film. If the film is measured in the basic processing module to determine when an amount equal in length to a standard microfiche has been drawn in, this determination can be utilized to turn off the drawing station and to energize the solenoid.

Figure 7:
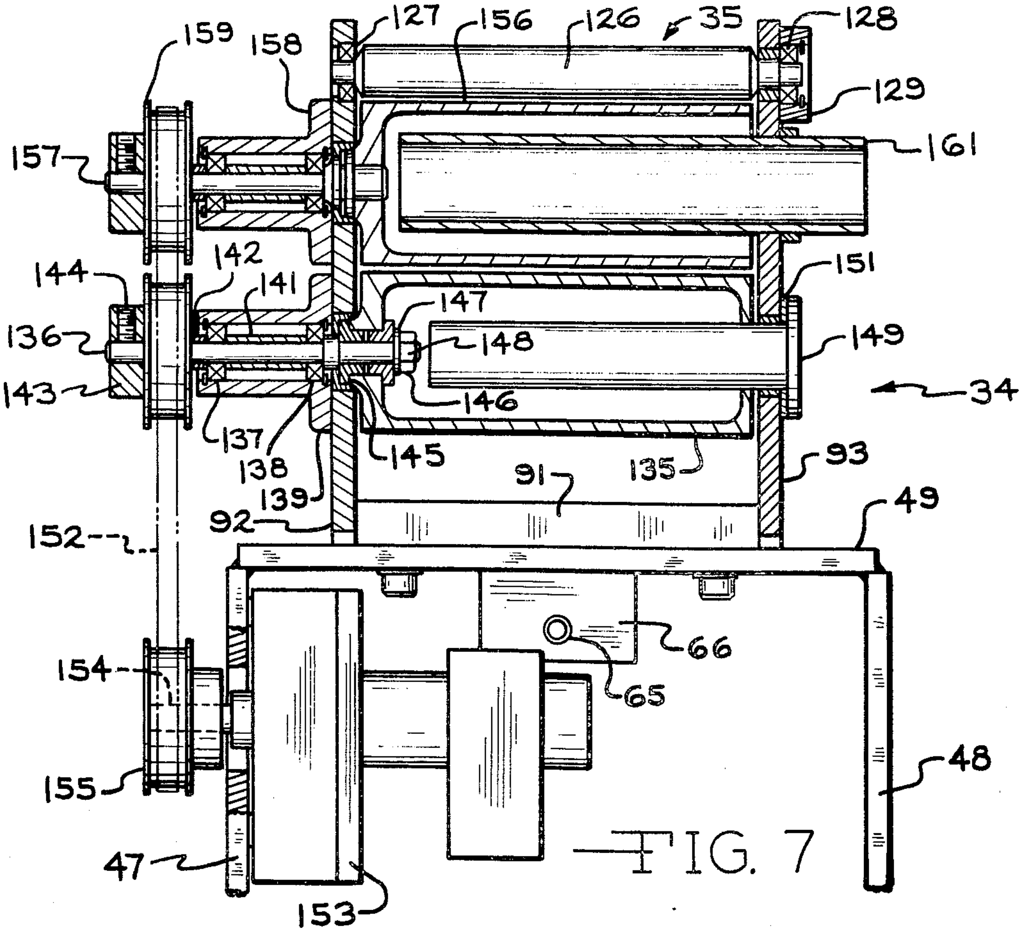
FIG. 7 is a cross-sectional view of the film heating station and the film cooling station of FIGS. 2 and 3 taken along the line 7—7 of FIG. 2.

FIG. 7 is a cross-sectional view of the film heating station 34 and the film cooling station 35. Referring to FIGS. 2, 3, 5, 6 and 7, there is shown the film heating station 34 which includes a conveyor belt 121, shown in phantom, which receives the microfiche duplicates as they are separated from the strip of film in the film cutting station 33 and transports the duplicates through the film heating station 34 to the film cooling station 35. A second conveyor belt 122, shown in phantom, accepts the duplicate microfiche from the heating station and transports it through the film cooling station to the film clearing station 36.

The end of the path of travel of each of the conveyor belts are defined by idler rollers 123, 124, 125 and 126 which contact the inwardly facing surface of the belt. Since all of the idler rollers are mounted in a similar manner, only the idler roller 126 will be discussed. The forwardly facing end of the idler roller 126 engages a ball bearing 127 which is press fitted into the front mounting plate 92. The rearwardly facing end of the idler roller 126 extends through an aperture in the rear mounting plate 93 and engages the ball bearing 128. A bearing mounting bracket 129 is attached to the rearwardly facing surface of the rear mounting plate 93 to retain the idler roller 126 and the ball bearing 128.

Tension is applied to the belts 121 and 122 by a pair of take up rollers 131 and 132 respectively which contact the inwardly facing surface of the belts. Since both take up rollers are mounted in a similar manner, only the take up roller 132 will be discussed. The forwardly facing end of the roller 132 extends through an aperture in the front mounting plate 92 and engages a ball bearing (not shown) retained in a bearing mounting bracket 133. The bracket 133 is attached to the forwardly facing surface of the plate 92 by a pair of cap screws which extend through a pair of horizontally elongated apertures in the plate and threadably engage a pair of nuts. The opposite end of the roller is retained by a bearing mounting bracket 134 which is attached to the rearwardly facing surface of the rear mounting plate 93. The cap screws and nuts holding the retainers 133 and 134 may be loosened to allow the position of the roller 132 to be changed to adjust the tension applied to the conveyor belt 122. The position of the roller 131 may also be changed to adjust the tension applied to the conveyor belt 121.

The film heating station 34 includes a hollow heating roller 135 mounted on end of a heating roller shaft 136. The shaft 136 is rotatably supported in a pair of ball bearings 137 and 138 which are retained in a bearing adapter 139. The rear bearing 138 is adjacent a collar on the shaft 136 and is separated from the front bearing 137 by a spacer sleeve 141. A second spacer sleeve 142 is positioned between the front bearing 137 and a pulley 143 which is attached to the forward end of the shaft by a set screw 144. Thus the shaft collar and the pulley 143 militate against axial movement of the shaft 136 in the bearings.

The rearward end of the shaft 136 is inserted into an aperture in the forward end of the hollow heating roller 135. A pair of bushings 145 and 146 are trapped between the shaft collar and a lockwasher 147 and a nut 148 on the rearward end of the shaft. The bushings have opposing flanges formed thereon which engage the inside and outside surfaces of the forward end of the roller 135 as the bodies of the bushings are inserted in the aperture in the forward end. When the nut 148 is tightened, the bushings 145 and 146 retain the roller 135 for rotation with the roller shaft 136. The bushings are formed from a heat insulating material to prevent heat loss from the roller 135 through the mounting elements.

A tubular heating element 149 is inserted through apertures in the rear mounting plate 93 and the rearward end of the hollow heating roller 135. The heating element is attached to the rearwardly facing surface of the rear mounting plate 93 and an insulating gasket 151 is trapped between the heating element mounting flange and the plate 93 to pevent heat loss. The heating element 149 is connected to a power source (not shown) and converts electrical energy into radiant energy which is transmitted through the air to the heating roller 135 which is formed from a metallic material. The microfiche duplicates are carried on the outer surface of the conveyor belt 121 into contact with the outer surface of the heating roller 135. This tends to soften the thermoplastic resin coating allowing the nitrogen gas to expand to form vesicules in the exposed areas. Furthermore, since the microfiche duplicates are being rolled in a direction opposite the direction they were wound on the supply reel in the basic processing module, they will tend to decurl.

The pulley 143 is in contact with a belt 152 which is driven by a gear motor 153. The gear motor 153 is attached to the rearwardly facing surface of the front support plate 47 by any suitable means such as cap screws and lockwashers and has an output shaft 154 which extends through an aperture in the plate. The cap screws are inserted into horizontally elongated apertures formed in the support plate 47 and threadably engage the gear motor. The cap screws may be loosened to allow horizontal movement of the gear motor to adjust the tension on the belt 152. A pulley 155 is attached to the forward end of the shaft 154 and contacts the belt 152. When the gear motor 153 is connected to a source of electrical power (not shown) the motor will rotate the pulley 155 to drive the heating roller 135 which rotates about the heating element 149 to heat the microfilm duplicates. The contact between the conveyor belt 121 and the heating roller 135 provides a frictional drive for the belt 121 even as the microfiche pass between them.

The cooling station 35 includes a hollow cooling roller 156 which is attached to a cooling roller shaft 157 for rotation therewith. The shaft 157 is mounted, in a manner similar to the shaft 136, in a bearing adapter 158 which is attached to the forwardly facing surface of the front mounting plate 92. A pulley 159 is attached to the forward end of the shaft 157 in driven relationship with the belt 152. The contact between the conveyor belt 122 and the cooling roller 156 provides a frictional drive for the belt 122 even as the microfiche duplicates pass between them.

One end of a pipe 161 extends through an aperture in the rear mounting plate 93 into the interior of the hollow cooling roller 156. The pipe is attached to the plate 93 with cap screws extending through apertures in an integral flange. The other end of the pipe is connected to a motor and fan for drawing a partial vacuum on the pipe. Air is drawn into the interior of the roller 156 through the open rearward end thereof from the atmosphere. This air is then drawn into the pipe 161 to the motor and fan. The roller 156 and the air flow therethrough conduct heat away from the microfiche duplicates to prevent excessive growth of the vesicules. The pipe 161 is connected to the motor and fan through the clearing station 36 by a tube 162 shown in phantom in FIG. 3.

Figure 8:
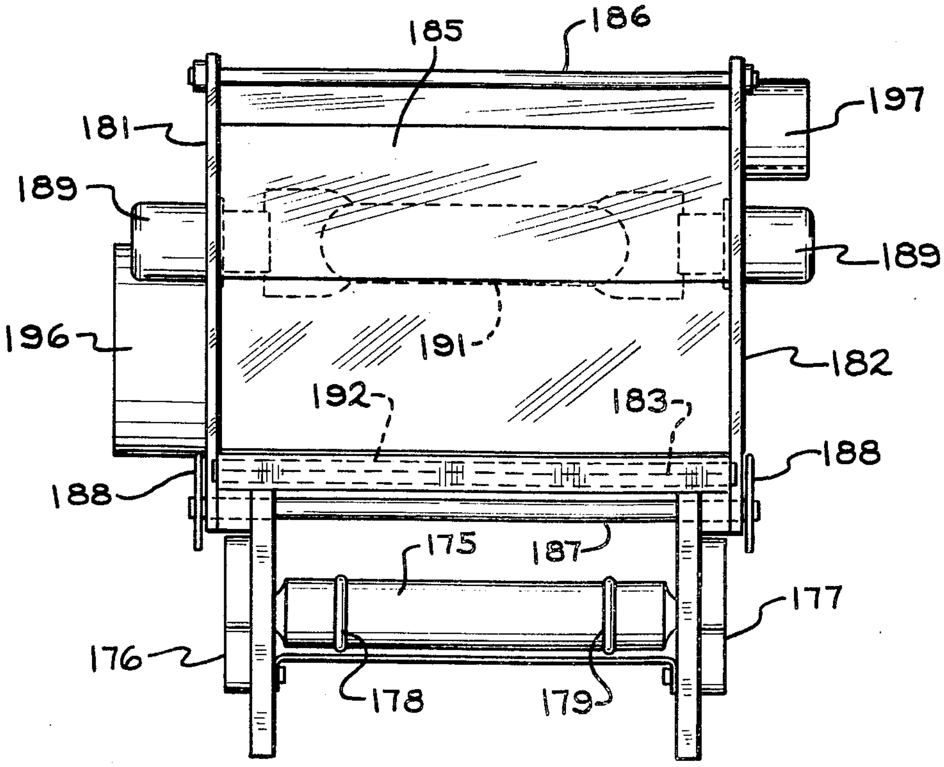
FIG. 8 is a side elevational view of the film clearing station of FIGS. 2 and 3 with the film receiving station removed.

FIG. 8 is a side elevational view of the film clearing station 36. Referring to FIGS. 2, 3, 6 and 8, there is shown a drive roller 171 mounted, in a manner similar to the shaft 136, in a bearing adapter 172 which is attached to the forwardly facing surface of the front mounting plate 92 adjacent the film cooling station 35. A pulley 173 is attached to the forward end of the roller 171 in driven relationship with the belt 152. The opposite end of the roller 171 extends through an aperture in the rear mounting plate 93 and engages a ball bearing (not shown) in a bearing mounting bracket 174. The mounting bracket 174 is attached to the rearwardly facing surface of the rear mounting plate 93.

A take up roller 175 is rotatably mounted in a pair of bearing mounting brackets 176 and 177 which are attached to the mounting plates 92 and 93 respectively adjacent the film receiving station 37. Each of the rollers 171 and 175 has a pair of radial grooves formed therein for receiving a pair of O-rings 178 and 179 which extend between the rollers to form a pair of parallel tracks. The bearing mounting brackets 176 and 177 are attached to the mounting plates with cap screws which extend through horizontally elongated apertures. The cap screws may be loosened to allow the roller 175 to be positioned to adjust the tension on the O-rings 178 and 179. As the roller 171 is rotated, the O-rings and the roller 175 will also be rotated to form a pair of moving tracks for transporting the microfiche duplicates from the film cooling station 35 to the film receiving station 37. Each microfiche duplicate exits the cooling station 35 at the drive roller 171 and is fed into the upper surface of the O-rings which carry it to the take up roller 175 where it falls into the receiving station 37.

As the microfiche duplicates are carried on the O-rings, they are subjected to ultraviolet radiation to clear the unexposed areas. A reflector hood assembly includes a front reflector plate 181 and a rear reflector plate 182 attached to the mounting plates 92 and 93 respectively. The reflector plates are spaced apart at the bottom corners thereof by a pair of spacer bars 183 and 184 which are attached by cap screws. A reflector hood 185 is inserted into a groove formed in the facing surfaces of the reflector plates. A pair of spacer rods 186 extend through apertures in the upper corners of the reflector plates and threadably receive nuts which are tightened against the outwardly facing surfaces of the reflector plates to retain the reflector hood 185 in the grooves. The ends of the hood are attached to the upper surfaces of the spacer bars. The spacer bars 183 and 184 rest on the upper edges of the mounting plates 92 and 93 which support the reflector hood assembly.

The reflector hood assembly is pivotally attached to the mounting plates 92 and 93 by a pair of pivot rods 187 which extend through apertures in the plates 92 and 93 and the lower corners of the reflector plates 181 and 182. A radial aperture is formed in each end of the rods 187 for receiving a cotter pin 188 to prevent movement of the rods along their axes. If the cotter pin in one of the rods are removed and the rod is removed from the apertures, the reflector hood assembly can be pivoted about the other rod to provide access to the O-ring tracks.

Each of the reflector plates has an aperture formed therein for receiving one of a pair of lamp holders 189. Each lamp holder has a mounting flange which abutts the inwardly facing wall of the reflector plates and is attached thereto. A source of high intensity ultraviolet radiation, typically a mercury vapor lamp 191, may be inserted in the lamp holders for irradiating the microfiche duplicates which pass below it on the O-ring tracks. A transparent window 192 is retained in a horizontal position in a pair of grooves formed in the lower portion of the inwardly facing walls of the reflector plates 181 and 182. The window seals the heat generated by the lamp away from the microfiche duplicates while allowing passage of the ultraviolet rays.

A motor and fan assembly 193 may be utilized to supply cooling air to the film cooling station 35 and the film clearing station 36. The motor and fan assembly may be mounted in the base 14 (not shown) of the cabinet 11 of FIG. 1. The assembly has an outlet 194 from which air is exhausted after it has been drawn through the cooling station 35 and the clearing station 36. The inlet of the assembly is connected to one end of a hose 195, shown in phantom, the other end of which is connected to an outlet pipe 196 in the front mounting plate 92. The air is drawn to the front plate 92 from an inlet pipe 197 in the rear mounting plate 93. The flowing air removes some of the heat generated by the mercury vapor lamp 191 as a cooling aid. The inlet pipe 197 is connected to the tube 162 so that the air flows in series through the film cooling station 35 and the film clearing station 36.

When the microfiche duplicates exit the film clearing station 36 they drop into a hopper 198 at the film receiving station 37. The hopper has a pair of tabs formed at one side edge of its front and rear walls. An aperture is formed in each tab for receiving a cap screw which threadably engages the mounting plates 92 and 93 for attaching the hopper adjacent the film clearing station. The upper portion of a side wall of the hopper is cut away so that the front and rear wall guide the microfiche duplicates into the hopper. The bottom wall of the hopper is slanted away from the horizontal to aid in stacking the microfiche. A mid-portion of the front wall is cut away to provide access to the stack of microfiche to aid in grasping them when they are to be removed.

In summary, the vesicular film advancing module includes a mounting bracket 31 for attaching the module to a basic processing module wherein the modules co-operate to produce microfiche duplicates of the master microfiche. The mounting bracket 31 provides the base for a film drawing station 32, a film cutting station 33, a film heating station 34, a film cooling station 35, a film clearing station 36 and a film receiving station 37. These film stations are positioned in a generally S shaped, compact path of travel for the film.

The basic processing module exposes metered segments of a continuous strip of microfilm in superposition with master microfiche to form latent images of the master microfiche on the exposed film. In those areas of the segment which correspond to the transparent areas of the master microfiche, a nitrogen gas is formed in a layer of thermoplastic resin. When the film is heated, the resin will soften to allow the gas to expand and form microscopic vesicules which will scatter incident light to form the image. Those areas of the segment which correspond to the opaque areas of the master microfiche will be subjected to a strong ultraviolet light in the clearing station to make them transparent. Thus, the duplicate microfiche will be a negative of the corresponding master microfiche.

In the film drawing station 32, a drawing roller 58 is spring loaded to co-operate with a guide roller in the basic processing module to frictionally engage the exposed strip of film. The drawing roller is rotated to draw the strip of film into the film cutting station 33 a segment at a time. A knife roller 97 co-operates with a knife bar 96 in the cutting station to separate the segment from the end of the strip of film. The separated segment falls onto a conveyor belt 121 which transports it through the film heating station 34. A heating roller 135 heats the segment to form the microscopic vesicules. Then the segment is transferred to a conveyor belt 122 which transports it through the film cooling station 35. A cooling roller 156 cools the film segment to prevent excessive growth of the vesicules.

The segment then enters the film clearing station 36 where it is exposed to ultraviolet light of a high intensity from a mercury vapor lamp 191 to clear the previously unexposed areas. Then the segment is stacked with other segments in a hopper 198 in the film receiving station 37 for collection. A fan and motor assembly 193 provide a source of cooling air which is connected in series through the film cooling station and the film clearing station.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

What I claim is:

1. In a microfiche duplicator having a basic processing module for exposing an unexposed segment of continuous strip of microfilm to dulicate a master microfiche and a selected one of a plurality of film advancing modules, a film advancing module for separating, developing and collecting the exposed film segment comprising a plurality of film stations for performing selected operations on the film segment wherein at least two of said film stations are positioned to define a generally S shaped, compact path of travel for the film segment and wherein a third one of said plurality of film stations and one of said film stations positioned to define the generally S shaped, compact path of travel are connected in series to a means for directing a flow of cooling air therethrough.

2. A film advancing module according to claim 1 including a film drawing station for drawing the continuous strip of microfilm into said film advancing module, a film heating station for heating the film segment and a film cooling station for cooling the film segment wherein said film heating station and said film cooling station define the generally S shaped, compact path of travel.

3. A film advancing module according to claim 1 including a film drawing station for advancing the continuous strip of microfilm into said film advancing segment from the continuous strip of microfilm.

4. A film advancing module according to claim 1 including a film heating station for heating the film segment, a film cooling station for cooling the heated film segment and a film clearing station for clearing the cooled film segment wherein said film heating station and said film cooling station define the generally S shaped, compact path of travel and said film clearing station is said third film station.

5. A film advancing module according to claim 1 including a film receiving station for collecting the film segment.

6. A film advancing module according to claim 1 wherein the continuous strip of microfilm is vesicular microfilm.

7. A film advancing module for separating, developing and collecting an exposed segment of a continuous strip of microfilm, comprising a plurality of film stations for performing selected operations on the film segments including a film cooling station for cooling the film segment and a film clearing station for clearing the film segment connected in series to a means for directing a flow of cooling air through said film cooling and film clearing stations.

8. A film advancing module according to claim 7 wherein said means for directing cooling air includes a motor and fan connected to said film clearing station for directing air through said film cooling station and said film clearing station in sequence.

9. A film advancing module according to claim 8 wherein the continuous strip of microfilm is vesicular microfilm.

* * * * *